United States Patent [19]

Rogers et al.

[11] Patent Number: 4,882,494
[45] Date of Patent: Nov. 21, 1989

[54] APPARATUS AND METHOD FOR FLOODING A NUCLEAR IMAGING DEVICE WITH RADIATION FROM AN IMAGING SOURCE

[75] Inventors: Roxanne R. Rogers, Houston, Tex.; Steven B. Kirby, Miami, Fla.; Theodore Simon, Dallas; Sharon Matthiesen, Arlington, both of Tex.

[73] Assignee: Michael D. Duncan, Dallas, Tex.

[21] Appl. No.: 160,839

[22] Filed: Feb. 26, 1988

[51] Int. Cl.$^4$ .............................................. G01T 1/164
[52] U.S. Cl. .............................. 250/363.09; 250/252.1
[58] Field of Search .......................... 250/363.09, 252.1

[56] References Cited

U.S. PATENT DOCUMENTS

| | | | |
|---|---|---|---|
| 1,531,620 | 3/1925 | Meyer | 378/207 |
| 1,589,833 | 6/1926 | Behnken et al. | 378/207 |
| 2,258,593 | 10/1941 | Black | 378/207 |
| 2,374,280 | 4/1945 | Gerke | 378/207 |
| 3,715,588 | 2/1973 | Rose | 378/207 |
| 4,014,109 | 3/1977 | Schramm | 378/207 |
| 4,066,902 | 1/1978 | LeMay | 378/207 |
| 4,071,760 | 1/1978 | LeMay | 378/207 |
| 4,172,978 | 10/1979 | Hounsfield et al. | 250/360 |
| 4,321,471 | 3/1982 | Holland et al. | 378/207 |
| 4,331,869 | 5/1982 | Rollo | 250/252.1 |
| 4,506,375 | 3/1985 | Manson | 250/252.1 |
| 4,516,025 | 5/1985 | Yamakawa et al. | 250/363.09 |
| 4,517,460 | 5/1985 | Meulenbrugge et al. | 250/252.1 |
| 4,571,491 | 2/1986 | Vinegar et al. | 250/252.1 |
| 4,613,754 | 9/1986 | Vinegar et al. | 250/252.1 |
| 4,646,341 | 2/1987 | Finer et al. | 378/207 |
| 4,649,561 | 3/1987 | Arnold | 378/207 |
| 4,663,772 | 5/1987 | Mattson et al. | 378/207 |
| 4,697,075 | 9/1987 | Roos et al. | 250/213 VT |

OTHER PUBLICATIONS

Uniformity Correction for SPECT Using a Mapped Cobalt-57 Sheet Source, Oppenheim and Appledorn, The Journal of Nuclear Medicine, vol. 26, No. 4, Apr. 1985.
Perspectives on Tomography, Keyes, The Journal of Nuclear Medicine, vol. 23, No. 7, 1982.
Physical Attributes of Single-Photon Tomography, Budinger, The Journal of Nuclear Medicine, vol. 21, No. 6, 1980.
Single Photon Emission Computed Tomography (SPECT) Principles and Instrumentation, Jaszczak and Coleman, Investigative Radiology, Dec. 1985.
NEMA A Guide.to Revised Standards for Performance Measurements of Scintillation Cameras, National Electrical Manufactures Association, 1986.

*Primary Examiner*—Carolyn E. Fields
*Attorney, Agent, or Firm*—Vaden, Eickenroht, Thompson & Boulware

[57] ABSTRACT

The present invention teaches a method for uniformly flooding a nuclear imaging device with radiation from a radiation-emitting calibration source and for correcting for the non-uniformity in count density of nuclear imaging sources and apparatus for carrying out the method. The method includes the steps of positioning a nuclear imaging flood source beneath or adjacent a nuclear imaging device such as a gamma camera having a plurality of radiation sensing elements; moving the source in a controlled motion; thereby blurring or diminishing the effects of any non-uniformities in the source. Apparatus for moving the source includes a support for the source and a means for moving the source adjacent to or beneath a camera. Circular motion may be achieved by connecting the support to means for rotating it, such as a motor drive shaft, or by manually rotating it. Other simple motion may be achieved by means which move the source about a simple curve. If complex motion is desired, one embodiment of the apparatus includes a plurality of geared shafts interconnected between the source support and a drive motor. The resultant motion is a complex continuous patterned motion which presents many points on the source to each of a plurality of sensors or detectors in the nuclear imaging device.

16 Claims, 10 Drawing Sheets

APPARATUS AND METHOD FOR FLOODING A NUCLEAR IMAGING DEVICE WITH RADIATION FROM AN IMAGING SOURCE

BACKGROUND OF THE INVENTION

1. Field of the Invention

This invention is directed to apparatus and methods for flooding a nuclear imaging device with radiation from a radiation source; for correcting for non-uniformities in count density in nuclear imaging sources; for providing uniform flooding of a nuclear imaging device by a standardized source (solid or liquid); and in one of its aspects is directed to such apparatus and methods for single photon emission computed tomography ("SPECT") and in another of its aspects is directed to such apparatus and methods for cobalt-57 sources.

2. Description of the Prior Art

In nuclear imaging, compensation can be made for various errors such as errors attributable to detection systems and items such as collimators. In compensating for these errors it is known to require a flood-field image of a standard radiation-emitting uniform source and to correct the images produced by a camera after it has been calibrated with the uniform source image. But in so calibrating nuclear imaging devices, a source with non-uniform radiation emission count density can cause errors for which compensation cannot be made. Especially in single photon emission computer tomography, source count density uniformity is a necessity; but sources, even certified standard sources, do exhibit varying degrees of count density non-uniformity. These source non-uniformities cannot be compensated for ("masked") as can deficiencies in the detection system (e.g. crystals or photo multiplier tubes) or deficiencies in a collimator.

Commercially available standard nuclear imaging sources, including solid sources and refillable liquid standards, exhibit some degree of non-uniformity. Refillable liquid standards such as liquid phantoms are subject to deformation, poor mixing, absence of retrospective verification, accidental contamination and substantial handling requirements. Increased handling required by refillable phantoms, such as a refillable liquid technetium-99m phantom, subjects technologists to increased radiation exposure.

Commercially available cobalt-57 solid sheet source standards generally fail to provide an adequate uniform count density. Such standards with a stated certified non-uniformity of ±1% may actually have a much higher non-uniformity if standard National Electrical Manufactures Association ("NEMA") procedures are applied, since certified non-uniformity is based on a sampling of counts from the surface of the standard rather than on a total surface radiography. Also, since non-uniformity is quantified from counts in only two smoothed pixels (the maximum and the minimum), the method is potentially dependent on small flaws.

One method proposed for compensating for source non-uniformity involves a tedious manual re-positioning of a source for mapping in multiple positions. See "Uniformity Correction for SPECT Using a Mapped Cobalt-57 Sheet Source," Volume 26, No. 4, The Journal of Nuclear Medicine, April 1985.

In accordance with §1.56 of 37 C.F.R., the following are disclosed:

U.S. Pat. No. 4,697,075 Image evaluation apparatus for quantitative and qualitative evaluation of an optical image generated by an x-ray imaging calibration using projection means U.S. Pat. No. 4,649,561 Test phantom for x-ray imaging systems U.S. Pat. No. 4,646,341 Calibration standard for x-ray fluorescence thickness measurement gauges U.S. Pat. No. 4,663,772 Bone mineral analysis phantom for medical diagnostic imaging U.S. Pat. No. 4,613,754 Tomographic calibration apparatus U.S. Pat. No. 4,571,491 Method for obtaining an atomic number image of an unknown material U.S. Pat. No. 4,517,460 Method of calibrating a gamma camera which samples the output signal of a photo-multiplier tube/amplifier combination U.S. Pat. No. 4,506,375 Radiometric calibration of an x-ray detector U.S. Pat. No. 4,331,869 A dynamic phantom system for cardiac monitoring U.S. Pat. No. 4,321,471 Monitoring the speed of rotation of a target of an x-ray source U.S. Pat. No. 4,172,978 Computerized tomographic apparatus which permits evaluation of differences in performance of multiple detectors U.S. Pat. No. 4,071,760 Radiography apparatus with photo cell drift compensating means U.S. Pat. No. 4,066,902 Radiography with detector compensating means U.S. Pat. No. 4,014,109 Test phantom for evaluating the scan of a nuclear imaging device U.S. Pat. No. 3,715,588 Bone mineral analyzer with a radioactive photon source U.S. Pat. No. 2,374,280 X-ray photographic timer tester U.S. Pat. No. 2,258,593 Calibration method for x-ray machines U.S. Pat. No. 1,589,833 Measuring device for measuring short-wave limit of x-ray spectrum and voltage of x-ray tube U.S. Pat. No. 1,531,620 Device for measuring the percentage of transmission and absorption of x-rays passing through a given medium

Publications

Uniformity Correction for SPECT Using a Mapped Cobalt-57 Sheet Source, Oppenheim and Appledorn, The Journal of Nuclear Medicine, Volume 26, Number 4, Apr. 1985.

Perspectives on Tomography, Keyes, The Journal of Nuclear Medicine, Volume 23, Number 7, 1982.

Physical Attributes of Single-Photon Tomography, Budinger, The Journal of Nuclear Medicine, Volume 21, Number 6, 1980.

Single Photon Emission Computed Tomography (SPECT) Principles and Instrumentation, Jaszczak and Coleman, Investigative Radiology, Dec. 1985.

NEMA A Guide to Revised Standards for Performance Measurements of Scintillation Cameras, National Electrical Manufacturers Association, 1986.

There has long been a need for efficient and effective apparatuses and methods for correcting for count density non-uniformity in nuclear calibration sources. There has long been a need for apparatuses and methods for uniformly flooding a nuclear imaging device such as a gamma camera with radiation from a standard radiation source. There has long been a need for them particularly for SPECT. The present invention recognizes, addresses, and satisfies these needs.

SUMMARY OF THE INVENTION

The present invention teaches a method for uniformly flooding a nuclear imaging device with radiation from an imaging source and for correcting for the non-uniformity in count density of nuclear imaging sources and apparatus for carrying out the methods. The method includes the steps of positioning a nuclear imaging flood source beneath or adjacent a nuclear imaging device such as a gamma camera having a plurality of radiation sensing elements; moving the source in a controlled motion; thereby blurring or diminishing the effects of any non-uniformities in the source, i.e., insuring that each sensor or detector in the camera receives radiation from more than one radiation-emitting area of the source so that each sensor receives a more similar amount of light (radiation) than if the source was not moved. The movement of the source can be accomplished over a long period of time, in a pattern, in a reproducible pattern, continuously, in a complex motion, or repetitively.

Apparatus for moving the source includes a support for the source and a means for moving the source adjacent to or beneath a camera. Circular motion may be achieved by connecting the support to means for rotating it, such as a motor drive shaft, or by manually rotating it. Other simple motion may be achieved by means which move the source about a simple curve. If complex motion is desired, one embodiment of the apparatus includes a plurality of geared shafts interconnected between the source support and a drive motor. The resultant motion is a complex patterned motion which presents many points on the source to each of a plurality of sensors or detectors in the camera, thus diminishing the effects of non-uniformities and local flaws in the source. In one embodiment the source can be a phantom or a refillable liquid phantom; but a solid source is preferred, particularly in cases requiring calibration for the common tracers technetium-99m and iodine-123, a solid cobalt-57 sheet flood source such as those which are commercially available. Other solid sources which are suitable include (but are not limited to) a solid radioactive gold source in calibrating for the heart tracer thallium-201.

It is therefore an object of the present invention to provide a method for correcting for non-uniformities in count density in a nuclear imaging source.

Another object of the present invention is the provision of apparatus for such correction.

Yet another object is the provision of such correction for single photon emission computed tomography.

A further object is the provision of such correction for solid and liquid sources and phantoms.

An additional object is the provision of such correction for solid sources, including but not limited to radioactive gold and cobalt-57 sources.

Another object is the provision of such correction which employs a method which includes, and apparatuses which produce, the continuous motion of the source with respect to a gamma camera or other nuclear imaging device.

Yet another object is the provision of such apparatus and method in which the motion is complex.

A further object of the invention is the provision of apparatuses and methods for uniformly flooding a nuclear imaging device with radiation from a source, particularly a standardized solid source.

To one of skill in this art who has the benefit of this invention's teachings, other and further objects, features, and advantages will be apparent from the following description of presently preferred embodiments of the invention, given for the purpose of disclosure, when taken in conjunction with the accompanying drawings. Although this disclosure is detailed to insure adequacy and aid understanding, this is not intended to prejudice that purpose of a patent which is to protect the invention no matter how others may later disguise it by variations in form or additions or further improvements. The claims at the end hereof are intended as an aid toward this purpose.

DESCRIPTION OF PREFERRED EMBODIMENTS

Figure 1:
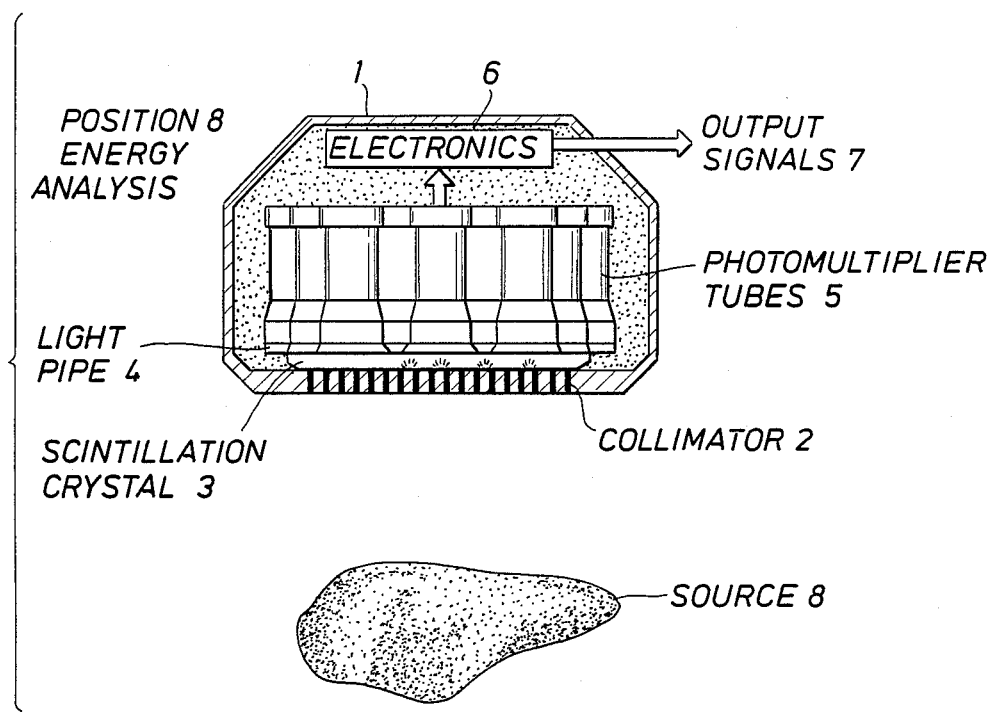
FIG. 1 is a schematic cross sectional view of a typical prior art nuclear imaging device, a gamma camera, disposed above a source of gamma radiation.
Figure 2:
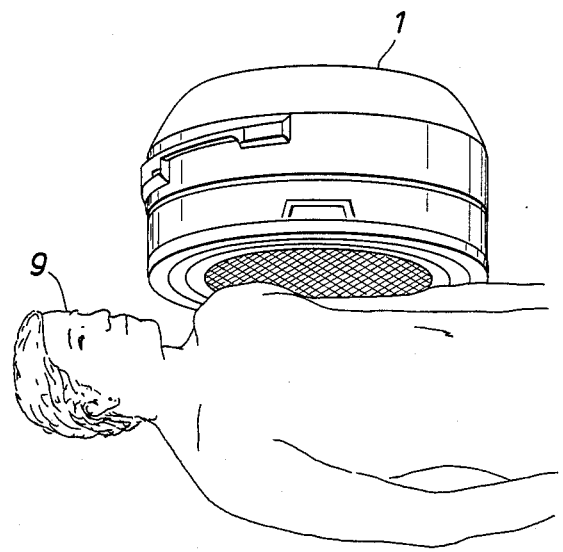
FIG. 2 is a side view of a gamma camera disposed above a human patient.
Figure 3:
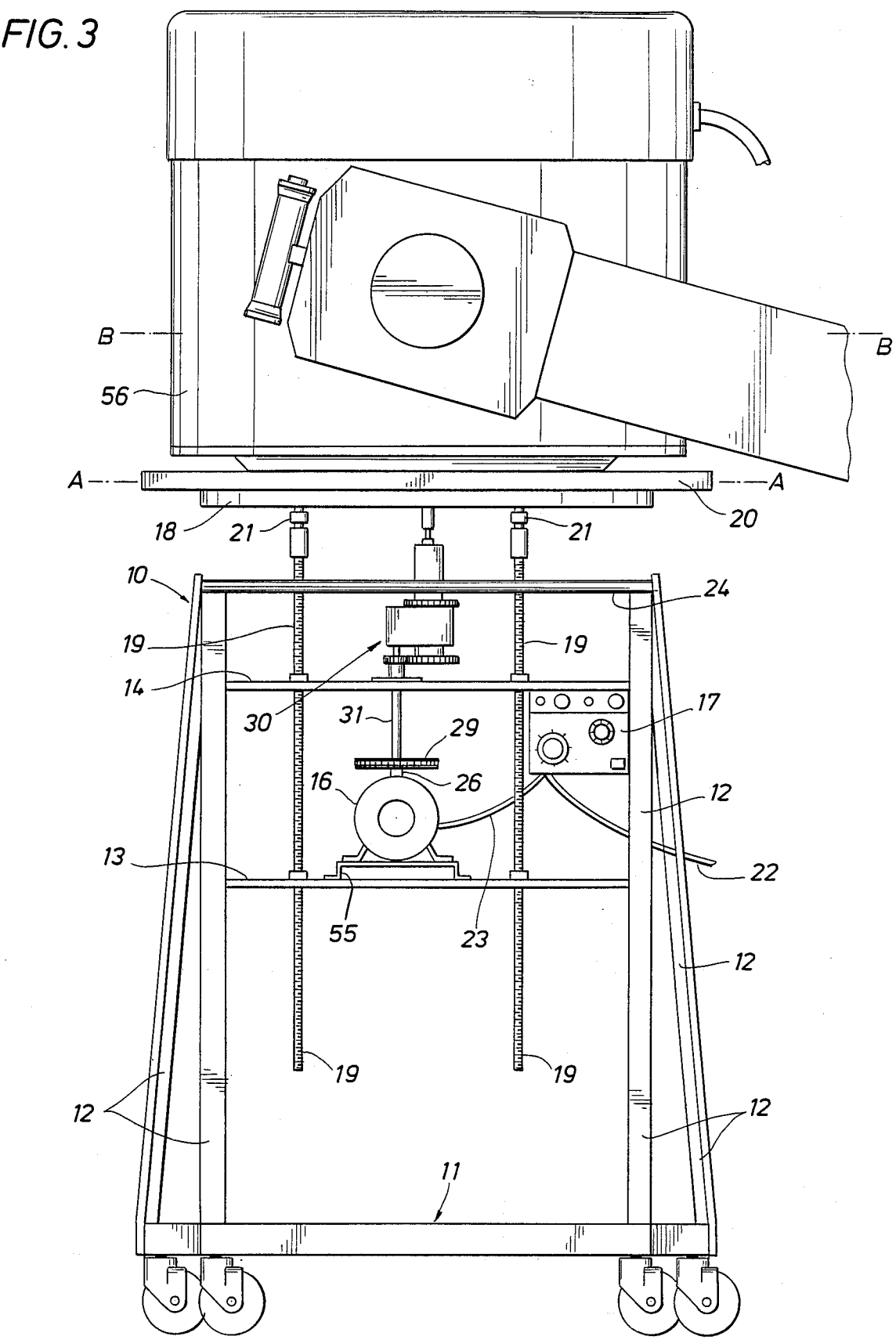
FIG. 3 is a front perspective view of apparatus according to the present invention disposed beneath a gamma camera.
Figure 4:
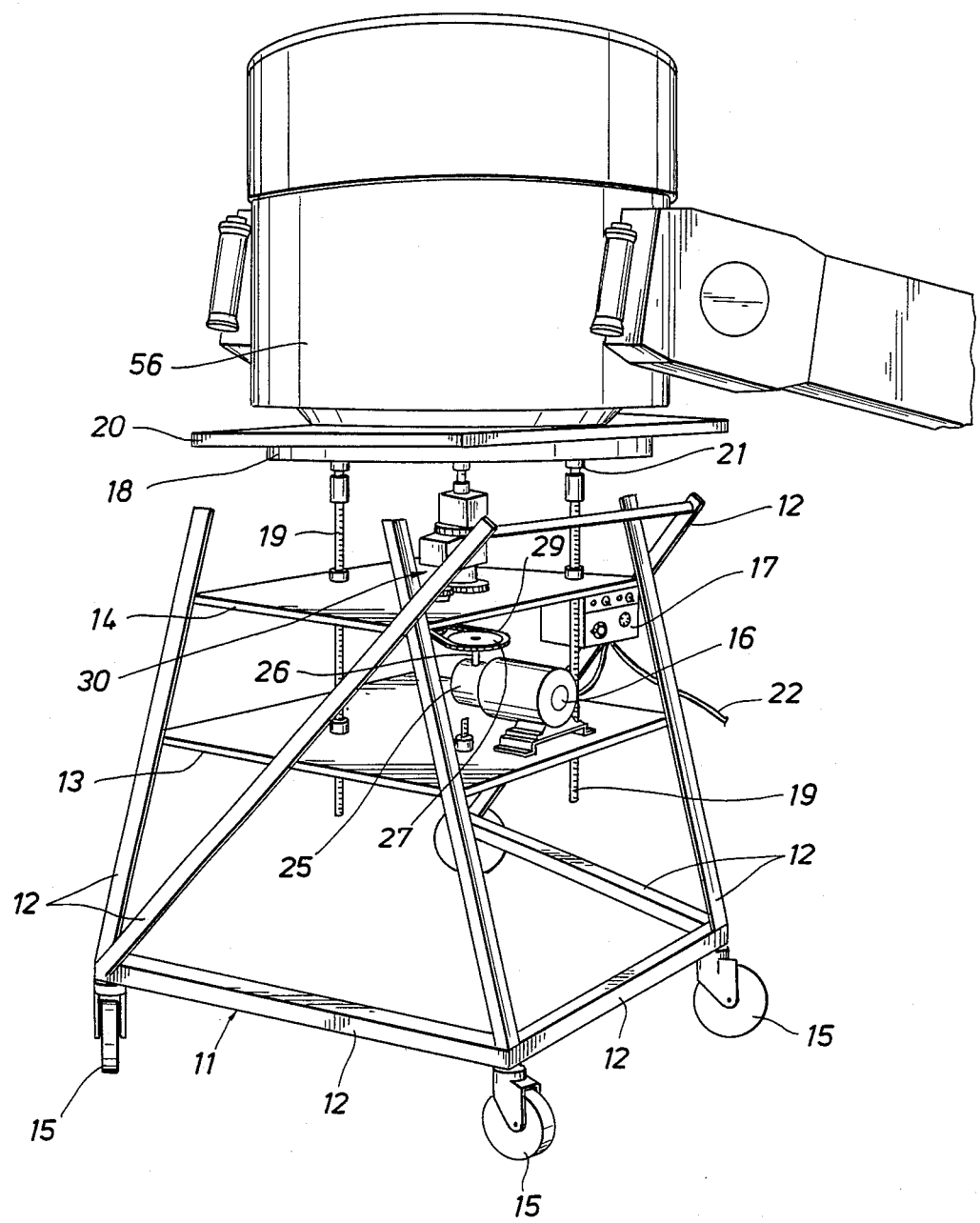
FIG. 4 is a side perspective view of the apparatus of FIG. 3.
Figure 5:
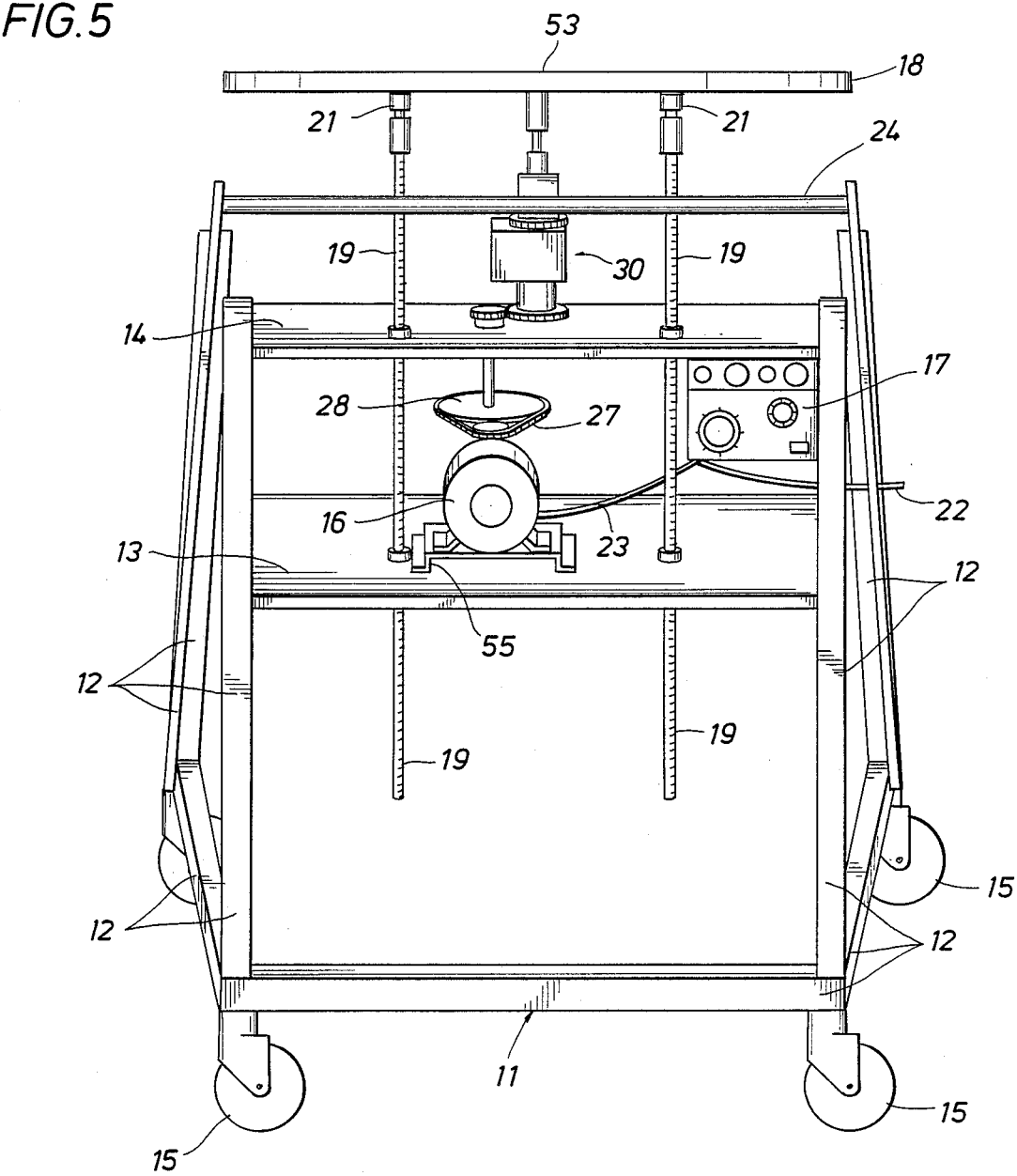
FIG. 5 is a front perspective view of the apparatus of FIG. 3 without the gamma camera or source.

FIG. 1 illustrates a typical commercially available prior art nuclear imaging device, a gamma camera 1, having a collimator 2 through which gamma radiation from a source 8 passes to a scintillation crystal 3, through a light pipe 4 to photo multiplier tubes 5 from which signals go to an electronics section 6 for position and energy analysis resulting in output signals 7. FIG. 2 illustrates the gamma camera 1 disposed above a human patient 9 who has received a radiation emitting radioisotope.

FIGS. 3-7 illustrate an apparatus 10 according to the present invention for moving a standard commercially available flood source 20 beneath a gamma camera 56. The apparatus 10 includes a cart 11 formed of various support members 12 welded together with a cart bottom shelf 13 extending between the support members and a cart top shelf 14 extending between the support members above the bottom shelf 13. For convenience of handling and movement the cart is mounted on wheels 15 and has a cart handle 24 extending between two of the support members above the top shelf 14.

An electric motor 16 is mounted to a motor mount 55 which is secured to the bottom shelf 13. The motor used was a model no. 544 from Bodine Electric Company. A speed control 17 is mounted to and beneath top shelf 14 with a power cord 22 extending therefrom. A power cord 23 extends from the speed control to the motor 16.

A plurality (four) of support rods 19 extend through and are secured to the top shelf 14 and the bottom shelf 13. A ball bearing 21 is mounted at the top of each support rod 19 and a source support plate 18 is movably disposed on the ball bearings 21. Experience has shown that casters (not shown) work as well as, but more quietly than, the ball bearings.

Figure 7:
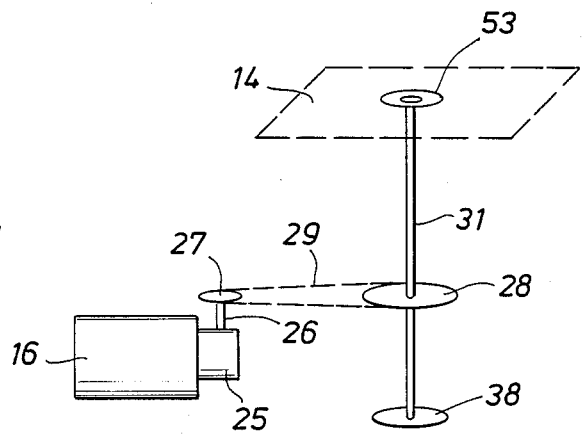
FIG. 7 is a schematic view of the motor-shaft linkage of the apparatus of FIG. 3.
Figure 6:
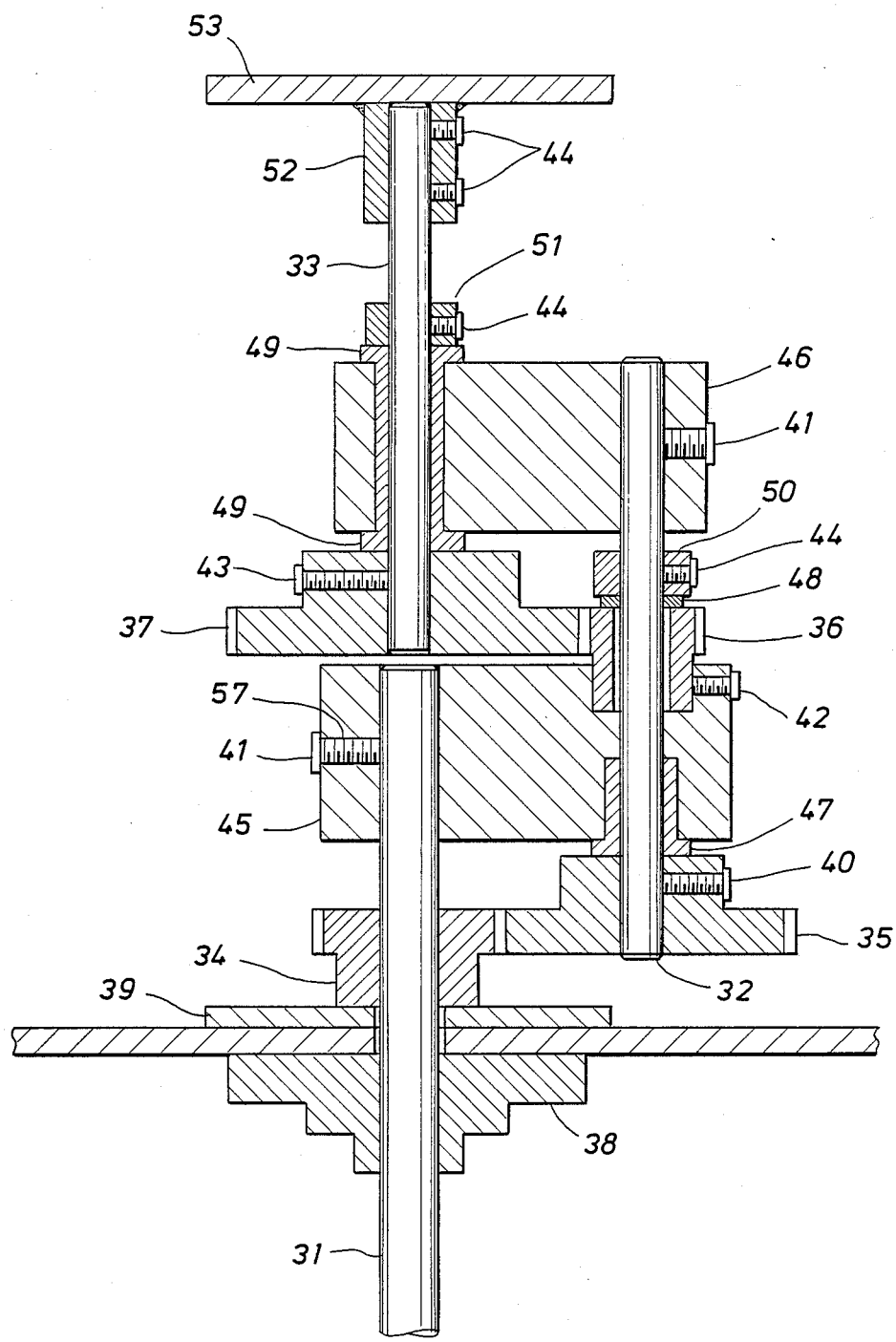
FIG. 6 is a side cross sectional view of the shaft and gear assembly of the apparatus of FIG. 3.

Between the motor 16 and the source support plate 18 is a gear-shaft assembly 30 which is shown in detail in FIG. 6. As shown in FIG. 7 the motor 16 has a gear box 25 from which a motor shaft 26 extends. A small sprocket 27 is secured to the shaft 26. A chain wraps around the small sprocket 27 and around a large sprocket 28 which is secured to a bottom shaft 31 of the gear-shaft assembly 30. The driven movement of the gear-shaft assembly 30 produces a complex motion pattern for the source 20 beneath the gamma camera 56. It is within the scope of this invention to move the source along a simple curve or along a complex curve. Circular motion can be achieved by simply driving a top shaft 33 by the motor directly.

As shown in FIG. 6, the bottom shaft 31 is disposed in and through and is rotatable within a bearing 38 which is secured to the top shelf 14. The shaft 31 is also disposed in and through and is rotatable within a bottom shaft gear 34. A bottom steel cuff 45 is secured to the bottom shaft 31 by a lock screw 41 in a recess 57 in the bottom steel cuff 45, the lock screw 41 engaging the bottom shaft 31.

A middle shaft 32 has a first middle shaft gear secured to it by a lock screw 40. The first middle shaft gear mates with and turns with the bottom shaft gear 34. The middle shaft 32 extends through and is rotatable within a bearing 47, the bottom steel cuff 45, and a bearing 48. A lock collar 50 secured to the middle shaft 32 by a lock screw 44 maintains the bearings 47, 48, a gear 36, and the cuff 45 in position about the middle shaft 32. The middle shaft 32 extends into and is secured to a top steel cuff 46 by a lock screw 41. A second middle shaft gear 36 is secured to and partially within the bottom steel cuff by a lock screw 42. The bearing 48 extends through and is rotatable within the second middle shaft gear 36.

A top shaft 33 extends through and is rotatable within bearings 49. The bearings 49 are partially disposed within the top steel cuff 46 which itself is tightly embraced about the bearings 49. A top shaft gear 37 secured to the top shaft 33 by a lock screw 43 mates with and turns with the second middle shaft gear 36. A lock collar 51 secured to the top shaft 33 by a lock screw 43 mates with and turns with the second middle shaft gear 36. A lock collar 51 secured to the top shaft 33 maintains the bearings 49 and the top steel cuff 46 in position above the top shaft gear 37. A top lock collar 52 is secured to the top shaft 33 by lock screws 44. A flange 53 welded to the top stop collar 52 supports and is secured to the source support plate 18 (see FIG. 5).

The bottom shaft 31 is driven by the sprocket 28 and rotates at a fixed axis with respect to the top shelf 14. The middle shaft 32, driven by the bottom shaft gear 34 through the first middle shaft gear 35, moves in a circle around the bottom shaft 31. The gears 34, 35 control the speed of the middle shaft 32.

The middle shaft 32 pulls the second middle shaft gear 36 along with it when it moves. The top steel cuff 46 moves with the middle shaft 32 since it is secured to the shaft. When the top steel cuff 46 moves, it pulls the top shaft 33 with it. As it does so, the top shaft gear 37 moves with the top shaft 33 and, in so doing, the top shaft gear 37 drives the second middle shaft gear 36. The speed of the top shaft 33 is dependent upon the gear ratio of gear 37 to gear 36 (in combination with the gear ratio of bottom shaft gear 34 to first middle shaft gear 35). The speed of the middle shaft 32 is dependent on the gear ratio of the bottom shaft gear 34 to the first middle shaft gear 35.

In the apparatus as shown in FIGS. 3–7 the gear ratio of gears 37, 36 was 3:1 and that of gears 34, 35 was 1.6:2.5. Of course any desired and appropriate ratios could be used. The chain 29 had a ¼ inch pitch; the small sprocket 27 had an effective diameter of 0.996 inches; and the large sprocket 28 had an effective diameter of 4.777 inches. The shaft 26 had a maximum speed of 72 revolutions per minute, but it was preferred to run it at about one-half that speed. Best results were obtained when the bottom shaft 31 was initially aligned with the top shaft 33 in order to align the source support plate beneath the nuclear imaging device. A change in the source support plate's motion path [to effect motion of the source along other simple or complex curves in a plane illustrated by line A—A in FIG. 3 which is parallel to a plane in which individual sensors (not shown) of the gamma camera are disposed (such as the plane of line B—B in FIG. 3] can be effected by a variety of changes including, but not limited to, changes in shaft diameter, gear diameter, gear ratios, and cuff size.

Figure 8:
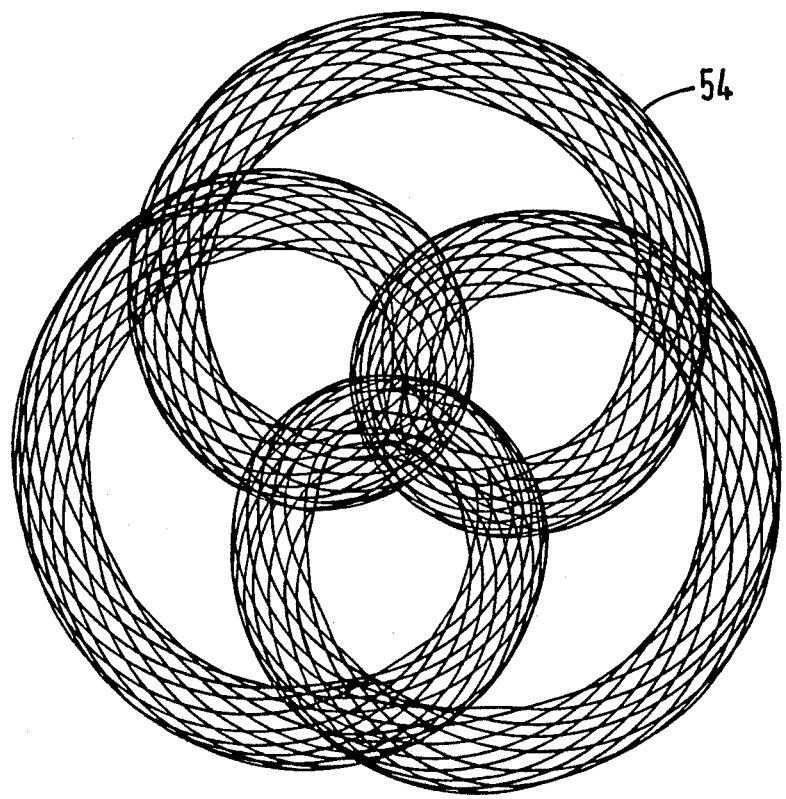
FIG. 8 is a reproduction of an actual trace of a pencil held against a piece of paper mounted on the support of the apparatus of FIG. 3 and rotated thereby.
Figure 12:
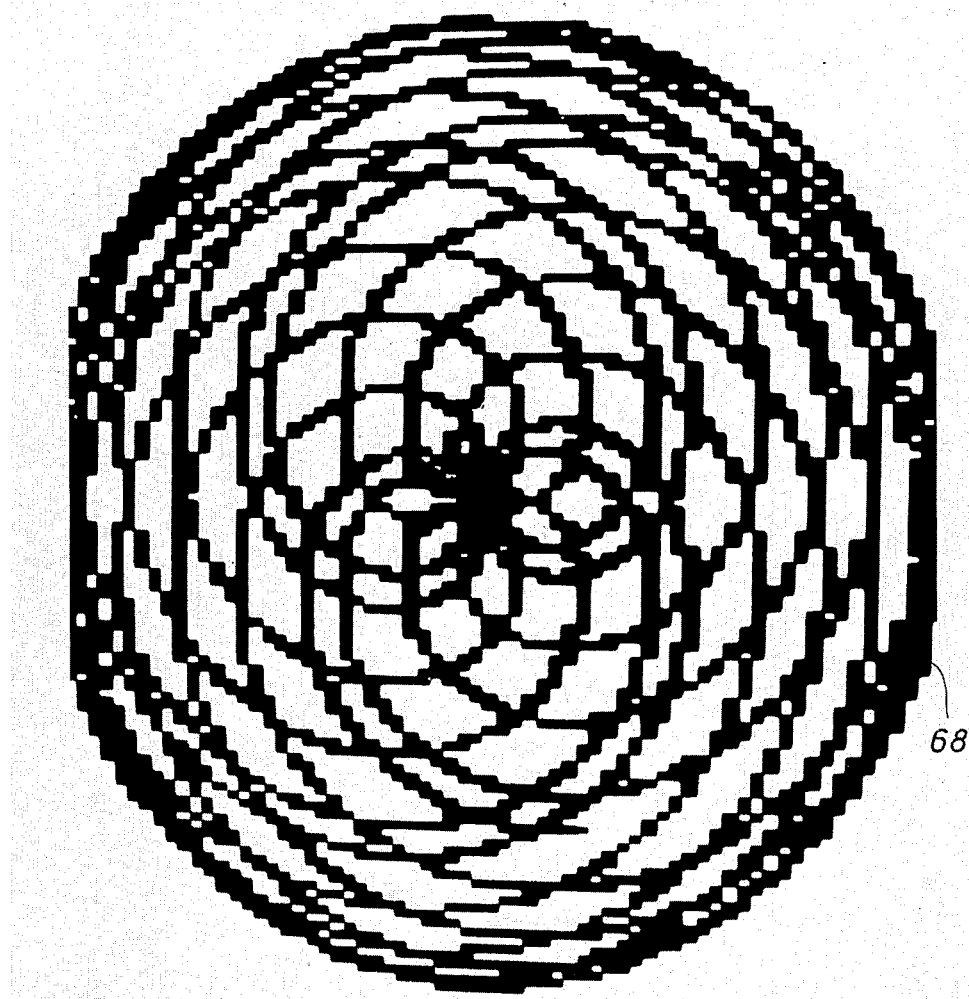
FIG. 12 is a copy of a computer-produced representation of the complex motion of a point on the source support of the apparatus of FIG. 3.

The controlled continuous complex motion achieved by the apparatus 10 is shown in two ways. A pencil trace 54 reproduced in FIG. 8 was obtained by placing a piece of paper on the source support plate 18 and holding a pencil above and in contact with the paper while the plate was moved by the apparatus 10. The trace of FIG. 8 shows the path that one detector in the camera takes over the source, i.e., it indicates the areas on the source detected by one detector in the camera. A motion trace 68 shown in FIG. 12 was produced by a computer simulation of the motion of the apparatus 10 and represents the path followed by a point on the support plate 18 about three inches outward from the top shaft 33. (Of course, the actual path is smooth and continuous.) This trace is that which would be produced on a piece of photographic film above the source if a point light source was placed on the source support plate and then the plate was moved by the apparatus 10.

Figure 9:
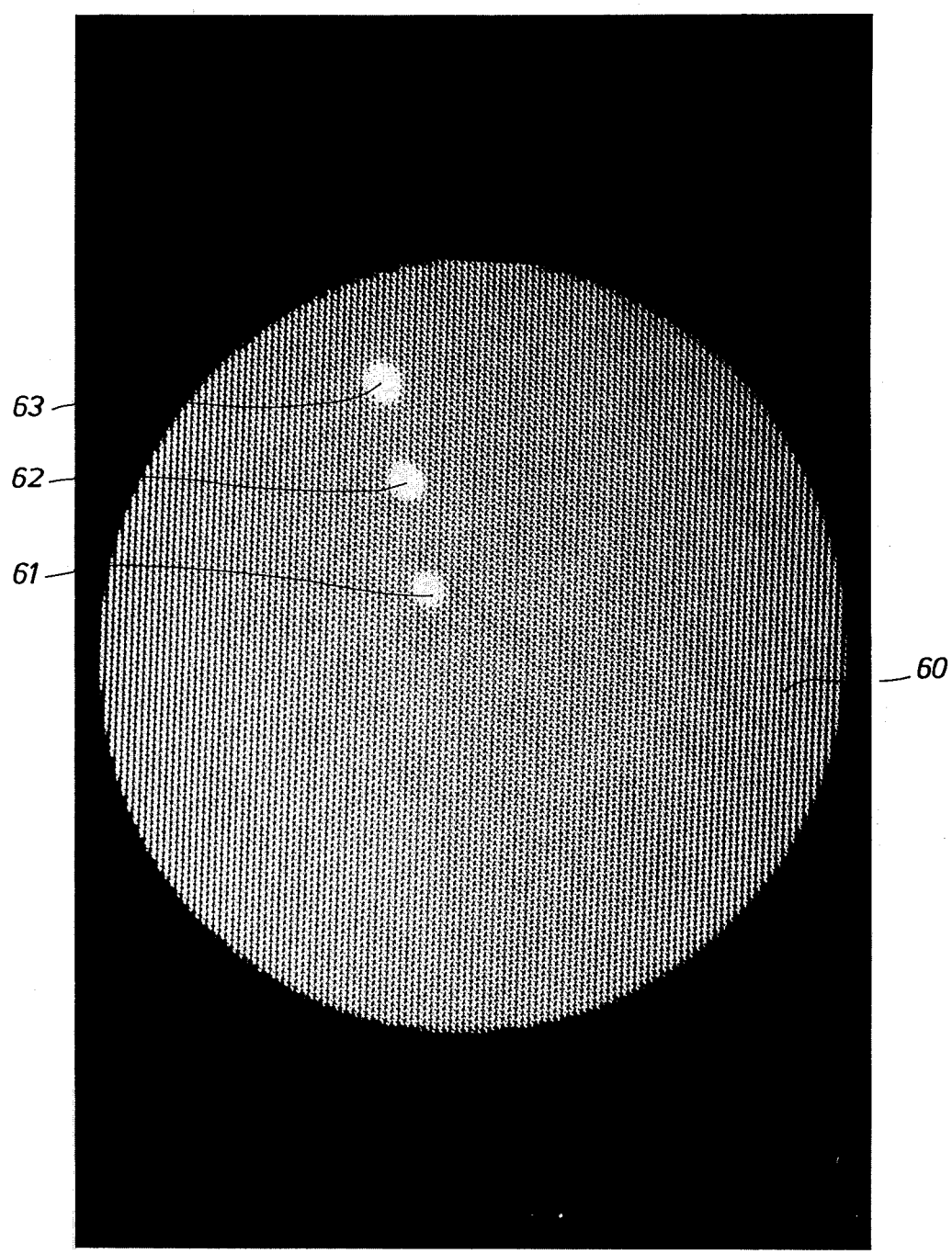
FIG. 9 is a copy of a flood image using a large stationary flood source with three small radiating disks placed on the large source.
Figure 10:
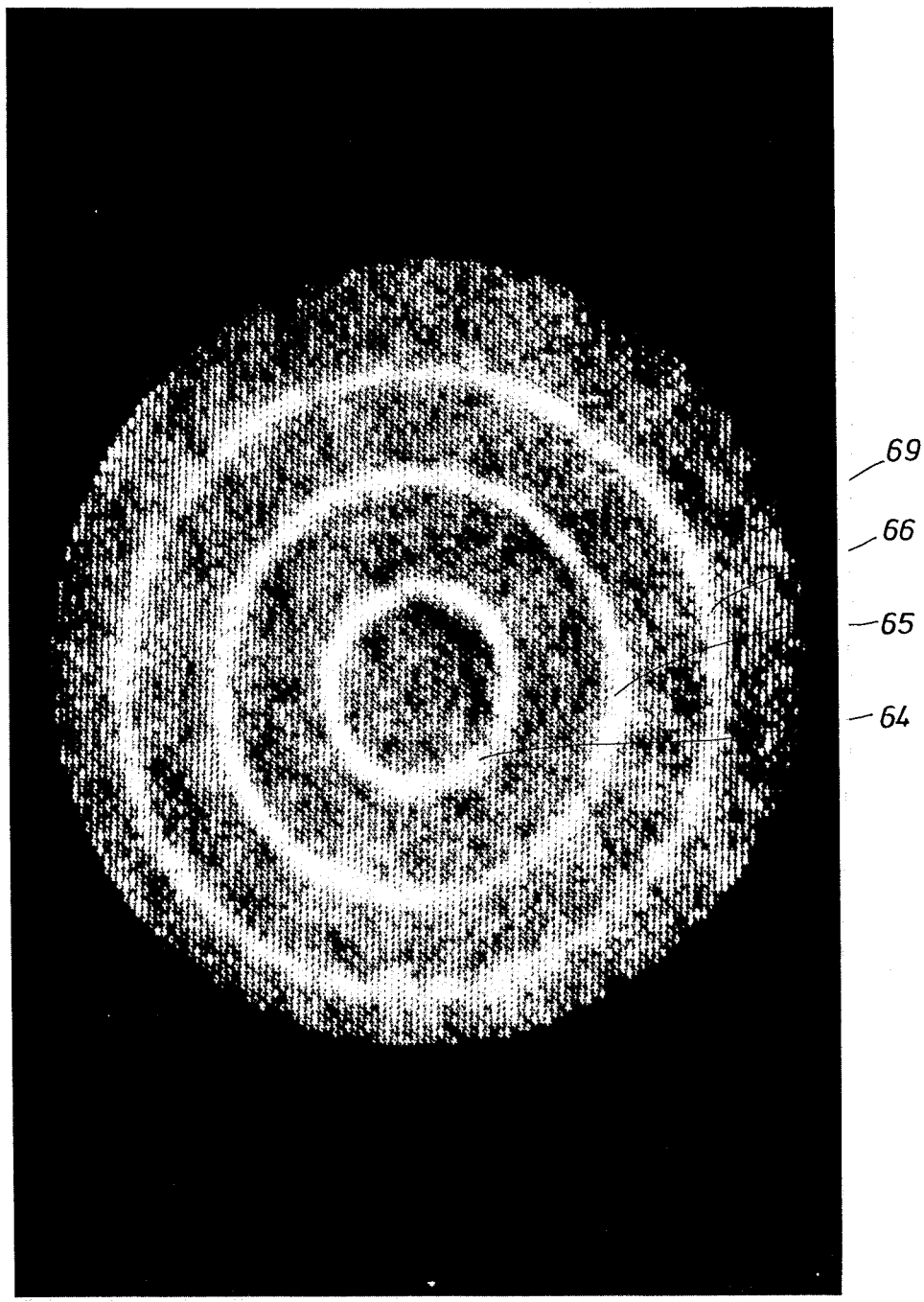
FIG. 10 is a copy of a flood image obtained by subjecting the source of FIG. 9 to simple (circular) motion according to the present invention.

As will be discussed in more detail below, the images shown in FIGS. 9–11 demonstrate the use of the present invention's methods and apparatus when a standard source has additional small radioactive areas. FIG. 9 illustrates a gamma radiation source image 60 which includes hot spots or flaws 61, 62, 63 created by the addition of three cobalt-57 discs to the standard source. FIG. 10 shows a gamma radiation source image achieved by subjecting the source which produced image 60 to simple circular motion according to this invention. This produced a more uniform image, but also produced undesirable ring disc image tracks 64, 65, 66. Subjecting the source which produced image 60 to complex motion with the apparatus 10 achieved the relatively more uniform image 67 shown in FIG. 11. Simple circular motion of the source support plate 18 can be achieved by simply mounting a shaft beneath the source support plate and rotating it either by hand or with a motor.

Figure 13:
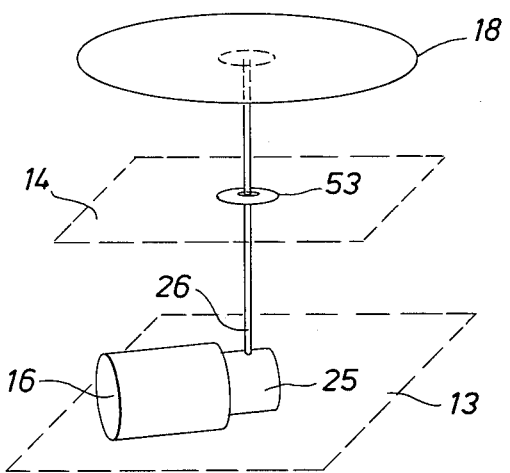
FIG. 13 is a schematic view of a motor-shaft combination for providing circular motion for the apparatus of FIG. 3.

As shown in FIG. 13 the motor 16 can have its drive shaft 26 connected directly to the support plate 18 to produce circular motion of a source placed on the support plate.

The effective non-uniformity of several flood correction approaches was quantified. Stationary approaches involved a commercially available standard 1% cobalt-57 flood source (ST) and a refillable Tc-99m pertechnetate flood source phantom (RE). The ST approach utilized a 10 mCi Co-57 solid sheet flood source certified as less than 1% non-uniform. The RE source was charged with 20 mCi Tc-99m pertechnetate, agitated, allowed to stand for 6 hours, and again agitated to achieve adequate mixing of activity throughout the source. Particular care was taken to avoid deformation of the phantom due to the volume of the Tc-99m solution. Motion was introduced first by circularly (CI) rotating ST at 25 revolutions per minute. Complex motion (CX) was achieved with an apparatus such as the apparatus 10 of FIG. 3. The continuously moving source repeated the pattern diagrammed in FIG. 12 every 17 minutes.

Non-uniformity was quantitated by autoradiography. Autoradiography was performed by attaching a cardboard cassette loaded with high resolution radiographic film to a fixed surface. For ST and RE determinations, the sources were placed beneath the loaded cassette for 60 and 18 hours, respectively. For CI and CX, the sources were moved beneath the loaded cassette for 60 hours. Exposed films were then developed.

The developed film was divided into one centimeter squares. A microdensitometer was used to measure the optical density of each square within the central (75%) field of view (CFOV) of each flood image. Multiple readings of arbitrary squares were taken to establish a reliability value. Optical density matrices were thus compiled for each flood. After appropriate smoothing according to NEMA procedures, the nonuniformity of each matrix was computed using the usual formula: the difference between the maximum and minimum smoothed pixel density divided by their sum. The standard deviation for optical densities measured in each square was also computed for each CFOV.

Since the purpose of these tests was to optimize the flood field matrix used to provide uniformity correction for SPECT data acquisition, each approach (ST, CI, CX and RE) was used to acquire 30,000,000 counts into a 64 by 64 digital matrix. The sources were imaged through a slightly defective low energy all purpose collimator to simulate the environment often encountered clinically. Each matrix was then analyzed using commercially available quality assurance software to compute differential and integral non-uniformity by standard methods.

Figure 11:
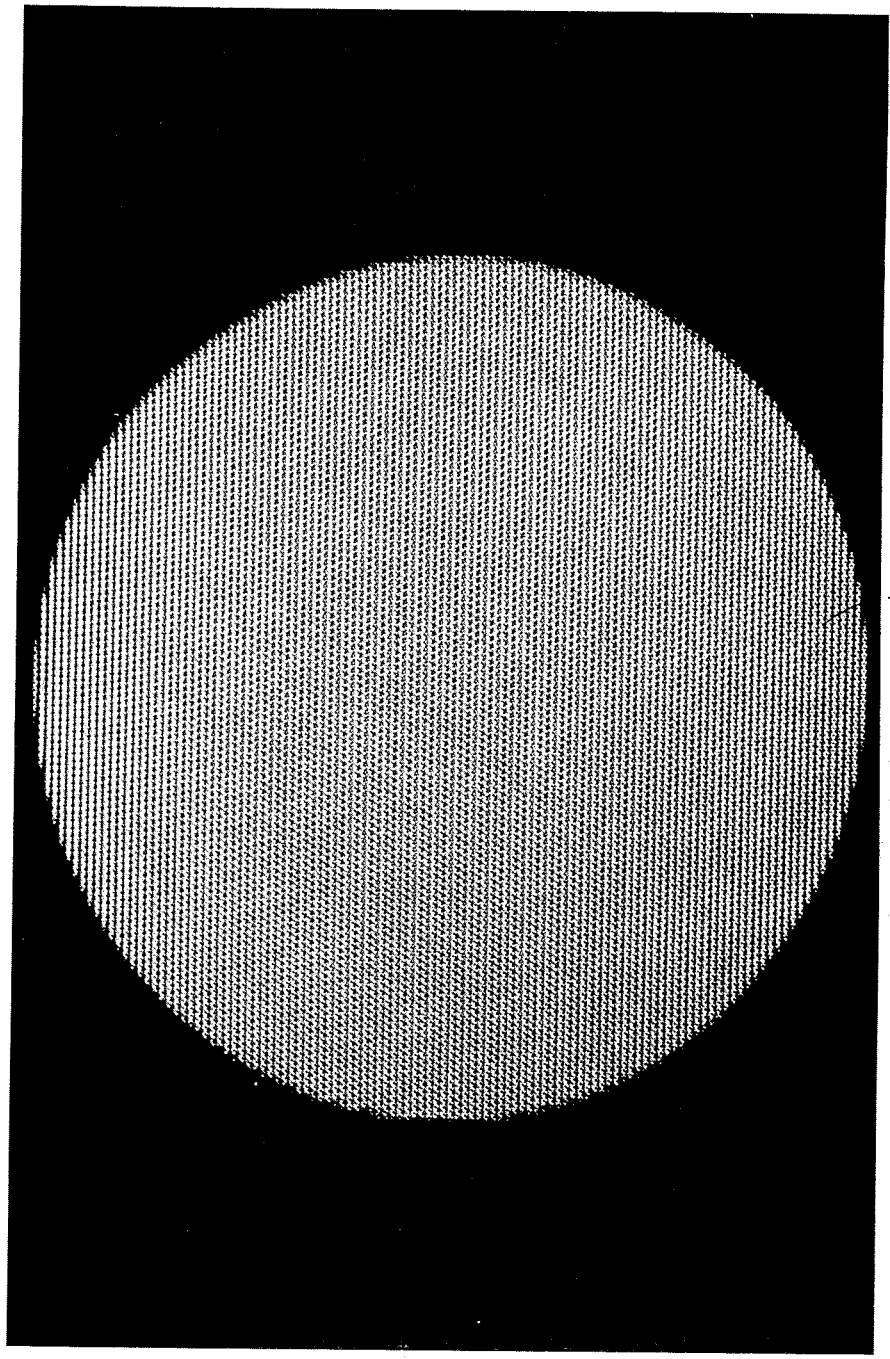
FIG. 11 is a copy of a flood image obtained by subjecting the source of FIG. 9 to complex motion according to the present invention.

Another experiment introduced local flaws, in the form of small Co-57 sources, to the flood source (see FIGS. 9-11). Flood images using the ST, CI and CX approaches were acquired for 30,000,000 counts. The same analytic methods were then applied as described in the paragraph above.

Autoradiographic analysis established the moving flood sources, CI and CX, as both more uniform than the stationary cobalt flood source, ST, and comparable to RE (Table I). The precision of the autoradiography was determined by repeating the reading of 112 regions. The optical density measured during the two readings was 1.211±0.018 and 1.217 ±0.020 (mean ± standard deviation). A single pixel was remeasured 90 times. The optical density was 1.120±0.004 (mean ± standard deviation).

The semiautomatic analysis using 30,000,000 count images confirmed the superior uniformity of CI and CX over ST. Acquisition times approximated 45 minutes for these flood images, a long period compared to the time required to complete the motion patterns. The RE values in this experiment were comparable to the moving sources (Table II).

TABLE I

| NONUNIFORMITY OF FLOOD SOURCES BY AUTORADIOGRAPHY NONUNIFORMITY | |
|---|---|
| Refillable Tc-99m | 3.7% |
| Standard Co-57 | 4.3% |
| Co-57 with circular motion | 3.0% |
| Co-57 with complex motion | 3.3% |

TABLE II

| NONUNIFORMITY OF FLOODS AS DETERMINED BY SCINTIGRAPHY | | |
|---|---|---|
| | DIFFERENTIAL NONUNIFORMITY | INTEGRAL NONUNIFORMITY |
| Point source | 2.6% | 3.4% |
| Refillable Tc-99m | 3.4% | 5.7% |
| Co-57 without motion | 4.2% | 6.4% |
| Co-57 with circular motion | 3.5% | 5.4% |
| Co-57 with complex motion | 3.2% | 5.5% |

The images of artificially introduced flood source flaws show that both CI (FIG. 10) and CX (FIG. 11) mute the effects of these artifacts. Importantly, CX blurred the flaws to the degree that they were no longer easily perceived (FIG. 11).

Moving the flood source improves the effective nonuniformity of the flood images using both autoradiography and standard, semiautomatic methods. This improvement persisted even in the face of nonuniformities imposed by the imaging system, accentuated by a defective collimator. The improvement was quite tolerant of severe local flaws although, in that case, complex motion was markedly better than simple circular motion. Simple circular motion resulted in unacceptable ring artifacts.

Thus, it is seen that the apparatuses and methods of the present invention readily achieve the ends and advantages mentioned as well as other inherent therein. While certain preferred embodiments of the present invention have been described and illustrated for the purposes of disclosure, it will be clear to one of skill in this art who has the benefits of this invention's teachings that changes in the arrangement and construction of parts and steps may be made which changes are embodied within the spirit and scope of the present invention as claimed below. It is intended that each element or step recited in any of the following claims and each combination of elements is to be understood as referring to all equivalent elements, equivalent steps, or equivalent combinations of elements or steps for accomplishing substantially the same results in substantially the same or equivalent manner.

What is claimed is:

1. A method for flooding a nuclear imaging device with radiation from a radiation emitting calibration source, the device having a plurality of radiation sensors, the source having multiple radiation-emitting areas, the method comprising the steps of
positioning the source adjacent the device for reception of radiation from the source by the device's sensors, and
moving the source in a controlled continuous motion so that individual sensors receive radiation from more than one radiation-emitting area of the source.

2. The method of claim 1 wherein the source is moved along a simple curve in a plane parallel to a plane in which the sensors are located.

3. The method of claim 1 wherein the source is moved along a complex curve in a plane parallel to a plane in which the sensors are located.

4. The method of claim 1 wherein the source is moved in a circle in a plane parallel to a plane in which the sensors are located.

5. The method of claim 1 wherein the nuclear imaging device is a gamma camera.

6. The method of claim 1 wherein the source is a solid sheet of cobalt-57.

7. The method of claim 1 wherein the source is solid radioactive gold.

8. A method for flooding a gamma camera with radiation from a radiation emitting solid sheet cobalt-57 imaging source, the camera having a plurality of radiation sensors, the source having multiple radiation-emitting areas, the method comprising the steps of
positioning the source adjacent the camera for reception of radiation from the source by the camera's sensors, and
moving the source in a controlled continuous motion along a complex curve in a plane parallel to a plane in which the sensors are located so that individual sensors receive radiation from more than one radiation emitting area of the source.

9. Apparatus for continuously moving a radiation emitting calibration source in a source plane adjacent to a nuclear imaging device, the device having a plurality of individual sensors for receiving radiation from the source, the sensors disposed in a sensor plane parallel to the source plane, the source having multiple radiation-emitting areas, the apparatus comprising
a support for the source,
a support shaft secured to the support,
a motor operatively connected to the support shaft for moving the support in a continuous controlled movement and thereby moving the source when it is on the support in the source plane so that individual sensors of the nuclear imaging device receive radiation from more than one radiation-emitting area of the source.

10. The apparatus of claim 9 wherein the source is a solid sheet of cobalt-57.

11. The apparatus of claim 9 wherein the source is solid radioactive gold.

12. The apparatus of claim 9 wherein the support is movable in a circle by the motor.

13. The apparatus of claim 9 wherein the motor has a drive shaft and wherein an intermediate shaft is disposed between and interconnected with the support shaft and the drive shaft by suitable gears and connectors on each shaft for providing non-circular movement of the source.

14. The apparatus of claim 14 wherein the non-circular movement is movement along a simple curve.

15. The apparatus of claim 13 wherein the non-circular movement is movement along a complex curve.

16. Apparatus for moving a solid radiation emitting calibration source in a source plane adjacent to a gamma camera, the camera having a plurality of individual sensors for receiving radiation from the source, the sensors disposed in a sensor plane parallel to the source plane, the source having multiple radiation-emitting areas, the apparatus comprising
a support for the source,
a support shaft secured to the support,
a motor operatively connected to the support shaft for moving the support in a controlled, continuous movement and thereby moving the source when it is on the support in the source plane so that individual sensors of the gamma camera receive radiation from more than one radiation-emitting area of the source,
the motor having a drive shaft and wherein an intermediate shaft is disposed between and interconnected with the support shaft and the drive shaft by suitable gears and connectors on each shaft for providing non-circular movement of the source along a complex curve.

* * * * *